United States
DeLuca

[11] 3,868,170
[45] Feb. 25, 1975

[54] METHOD OF REMOVING ENTRAPPED GAS AND/OR RESIDUAL WATER FROM GLASS

[75] Inventor: Robert D. DeLuca, Big Flats, N.Y.
[73] Assignee: Corning Glass Works, Corning, N.Y.
[22] Filed: Mar. 30, 1972
[21] Appl. No.: 239,746

[52] U.S. Cl............ 350/96 WG, 65/3, 65/18, 65/30, 65/32, 65/60, 161/1
[51] Int. Cl.............. G02g 5/14, C03c 15/00
[58] Field of Search............ 65/32, 30, 3, 134, 18, 65/60; 350/96 WG; 161/1

[56] References Cited
UNITED STATES PATENTS

| | | | |
|---|---|---|---|
| 3,228,760 | 1/1966 | Jack et al | 65/32 |
| 3,228,761 | 1/1966 | Jack et al | 65/32 |
| 3,338,694 | 8/1967 | Davy | 65/32 |
| 3,527,711 | 9/1970 | Barber et al | 65/32 X |
| 3,647,406 | 3/1972 | Fisher | 65/30 |
| 3,659,915 | 5/1972 | Maurer et al | 65/30 X |
| 3,711,262 | 1/1973 | Keck et al | 65/3 |
| 3,756,798 | 9/1973 | Ernsberger | 65/32 X |

Primary Examiner—S. Leon Bashore
Assistant Examiner—Frank W. Miga
Attorney, Agent, or Firm—Walter S. Zebrowski; Clarence R. Patty, Jr.

[57] ABSTRACT

A method of forming an article, such as a low loss optical waveguide, by applying to a starting member a layer of glass soot to form a porous body. The porous body is then placed in a controlled environment in which a predetermined desired concentration of gases is maintained. The porous body is heated below the sintering temperature of the glass to permit entrapped gas to escape therefrom and the temperature is maintained until an equilibrium is reached between the partial pressure of the entrapped gas in the porous body and the partial pressure of the same gas in said environment. Thereafter, the porous body is further heated to at least the sintering temperature of the glass to sinter the soot particles and to form a consolidated dense member which may thereafter be formed into a desired shape while within said environment.

24 Claims, 10 Drawing Figures

FREE ENERGY CHANGES FOR $TiO_2$
OXIDATION-REDUCTION REACTIONS.

EFFECT OF TEMPERATURE AND OXYGEN CONCENTRATION ON $Ti^{+3}$ IN 2.5 WEIGHT PERCENT $TiO_2$ AND 97.5 WEIGHT PERCENT $SiO_2$ GLASS.

EFFECT OF $H_2$, OH ON $Ti^{+3}$ IN 2.5 WEIGHT PERCENT $TiO_2$ AND 97.5 WEIGHT PERCENT $SiO_2$ GLASS

EFFECT OF $H_2$, $H_2O$ ON $Ti^{+3}$ IN 2.5 WEIGHT PERCENT $TiO_2$ AND 97.5 WEIGHT PERCENT $SiO_2$ GLASS

METHOD OF REMOVING ENTRAPPED GAS AND/OR RESIDUAL WATER FROM GLASS

BACKGROUND OF THE INVENTION

I. Field of the Invention

This invention deals with a method of forming high optical purity blanks that are free of residual water and entrapped gases from which high optical quality lenses, prisms, optical waveguides, and the like can be made.

Waveguides used in optical communications systems are referred to as "optical waveguides" and are normally constructed from transparent dielectric material such as glass or plastic.

It is well known to one skilled in the art that light can be caused to propagate along a transparent fiber structure which has a higher refractive index than its surroundings. The ordinary use of such optical waveguides is to transmit a signal or an image, that is light which has been modulated in some form, from one point to another. To be effective, optical fibers produced for these purposes must avoid excessive attenuation of the transmitted light usually resulting from one or more causes such as scattering, absorption, or the like. One serious cause of light attenuation by scattering or absorption is due to the presence of residual water or other entrapped gases within the glass material. Further, to be an effective transmitting media for an optical communication system, an optical waveguide should not only transmit light without excessive attenuation, but should allow only preselected modes of light to propagate along the fiber.

Operational theories and other pertinent information concerning optical waveguides may be found in U.S. Pat. No. 3,157,726 issued to Hicks et al.; in the publication entitled "Cylindrical Dielectric Waveguide Mode" by E. Snitzer, Journal of the Optical Society of America, Vol. 51, No. 5, pages 491-498, May 1961; and in "Fiber Optics Principles and Applilcations" by N. S. Kapany, Academic Press (1967).

The propagatioin of light waves is governed by the same laws of physics that govern microwave propagation, and therefore, can also be studied in terms of modes. Since each mode of light traveling around a glass fiber structure propagates at its own inherent velocity, it can be shown that information initially supplied to all modes will be dispersed after traveling a given length of fiber due to different propagation velocities. If light propagation along an optical fiber could be restricted to preselected modes, clearly more effective information transmission would result. Producing a satisfactory optical waveguide has been one of the more difficult problems in the development of an effective optical communication system.

II. Description of the Prior Art

A method heretofore used for producing an optical fiber is described as follows. A rod of glass possessing the desired core characteristics was inserted into a tube of glass possessing the desired cladding characteristics. The temperature of this combination was then raised until the viscosity of the materials was low enough for drawing. The combination was then drawn until the tube collapsed around and fused to the inside rod. The resulting laminated rod was then further drawn until it cross-sectional area was decreased to desired dimensions. During the drawing process, the rod and tube would normally be fed at different speeds to attempt to produce a fiber with the desired core to cladding diameter ratio. This method, however, has been sometimes unsatisfactory because of the particular difficulty in maintaining the core and cladding dimensions. Further, residual water in ordinarily produced glass causes absorptive attenuation. By residual water in glass is meant that the glass contains a high level of OH, $H_2$ and $H_2O$. One explanation of residual water may be found in U.S. Pat. No. 3,531,271 to W. H. Dumbaugh, Jr. An aditional problem is that numerous tiny air bubbles and foreign particles are often entrapped within the glass material or at the core and cladding interface and become a source of light scattering centers. In addition, the core and cladding materials of any waveguide must be selected so that there is a precise difference between the two indices of refraction. Glass tubes and glass rods which simultaneously have precise differences in their indices of refraction, low residual water content, similar coefficients of expansion and similar viscosities are not readily available. Variations in core diameter or in either index of refraction may significantly affect the transmission characteristics of a waveguide.

SUMMARY OF THE INVENTION

It has been found that, in order to produce suitable optical waveguides, attenuation must be kept to below about 20 db/km over the entire wavelength range, for example, about 600-1,500 nm. In order to achieve this level of light attenuation in the long lengths of optical fibers which are used in present and proposed optical communication systems, it has been found that among other requirements residual water within the glass must be reduced to a level of less than about 20 parts per million (ppm).

As used herein generally, the term entrapped gas shall be understood to include residual water.

It is an object of the present invention to provide an article and method for producing it which overcome the heretofore noted disadvantage.

Other objects of the present invention are to provide a method of producing an article which is substantially free of residual water and other entrapped gases, from which article may be formed an optical waveguide that will not cause excessive light absorption losses, that will not cause excessive dispersion of the transmitted light, that does not have light scattering centers within the glass material and at the core and cladding interface, and that has otherwise improved characteristics.

Broadly, according to this invention an article formed of glass substantially free of residual water and other entrapped gases is produced by providing a suitable starting member and then depositing a quantity of glass soot by flame hydrolysis on the starting member to form a porous body. The porous body is then placed in a controlled environment within which a predetermined desired concentration of gases is maintained. The porous body is then heated to a temperature below the sintering temperature of the glass to permit entrapped gas to escape therefrom. The temperature is maintained until an equilibrium is reached between the partial pressure of the entrapped gas in the body and the partial pressure of the same gas in the environment. The body is then heated to at least the sintering temperature of the glass to sinter the soot particles and form a consolidated dense member. If desired, the starting member may be removed from said consolidated memeber outside of said environment. Further, if desired, the consolidated dense member may thereafter be formed to a desired shape within the same environment.

If an optical waveguide is to be formed from the consolidated dense member, a coating of glass having an index of refraction lower than that of the consolidated member may then be applied to the exterior surface of the member by any desired means such, for example, as flame hydrolysis. If necessary, the coating is sintered and consolidated as above described. Such a coating will form the waveguide cladding while the consolidated member will form the waveguide core. With the starting member removed, a substantially cylindrical hollow assembly is formed. This assembly is then heated to a temperature at which the materials have a low enough viscosity for drawing and is drawn to reduce the diameter thereof until the hole resulting from the removal of the starting member is collapsed. That is, the longitudinal hole is sealed to form a solid rod surrounded by the cladding coating of glass. Thereafter, continued drawing of the composite structure further reduces the diameter thereof to form a glass optical fiber which possesses the characteristics of the desired optical waveguide. That is, it transmits preselected modes of light without excessive attenuation or absorption losses, does not cause excessive dispersion of the transmitted light, and provides an improved cladding-core interface. The waveguide should preferably be drawn in the same controlled environment. The glass of the optical waveguide so formed contains less than 20 ppm of residual water.

These and additional objects, features and advantages of the present invention will become apparent to those skilled in the art from the followilng detailed description and the attached drawing, on which, by way of example, only the preferred embodiments of this invention are illustrated.

DETAILED DESCRIPTION OF THE INVENTION

It is to be noted that the drawings are illustrative and symbolic of the present invention and there is no intention to indicate the scale or relative proportions of the elements shown therein. For the purposes of simplicity, the present invention will be substantially described in connection with the formation of a low loss optical waveguide although this invention is not intended to be limited thereto.

Figure 1:
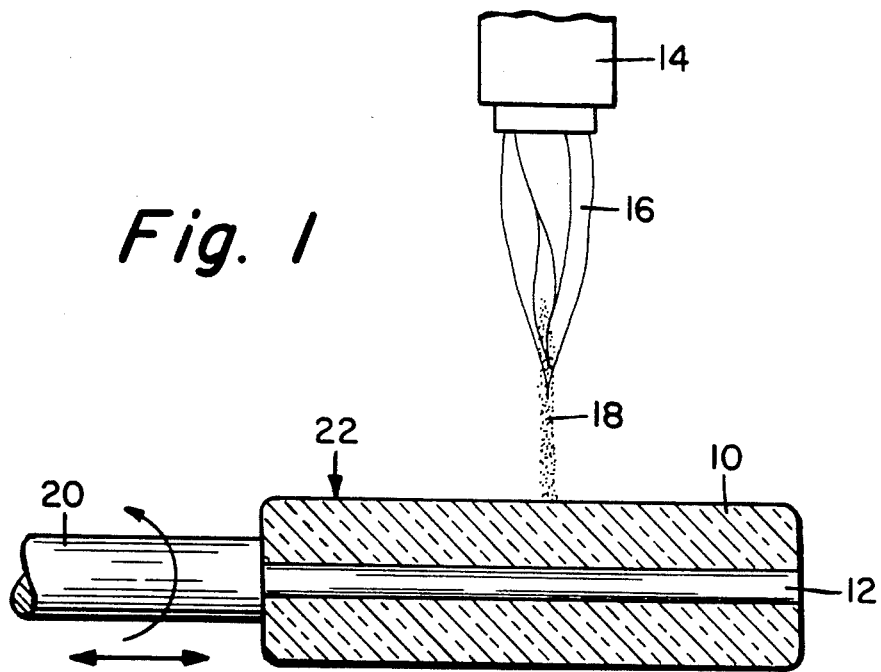
FIG. 1 is an illustration of a means of applying a coating of glass soot to the outside of the starting member.

Referring to FIG. 1, a layer 10 of glass is applied to a substantially cylindrical starting member or rod 12 by means of flame hydrolysis burner 14. Fuel gas and oxygen or air are supplied to burner 14 from a source not shown. This mixture is burned to produce flame 16 which is emitted from the burner. A gas-vapor mixture is hydrolyzed within flame 16 to form a glass soot that leaves flame 16 in a stream 18 which is directed toward starting member 12. The flame hydrolysis method of forming layer 10 is hereinafter described in detail. Starting member 12 is supported by means of support portion 20, and is rotated and translated as indicated by the arrows adjacent thereto in FIg. 1 for uniform deposition of the soot. It is to be understood that an elongated ribbon burner, not shown, that provides a long stream of soot could be used in place of the substantially concentric burner illustrated in FIG. 1 whereby starting member 12 would only have to be rotated. Further, a plurality of burners 14 could be employed in a row to similarly require only rotation.

Since glass starting member 12 is ultimately removed, the material of member 12 need only be such as to have a composition and coefficient of expansion compatible with the material of layer 10. A suitable material may be a normally produced glass having a composition similar to that of the layer 10 material although it does not need the high purity thereof. It may be normally produced glass having ordinary or even an excessive level of impurity or entrapped gas that would otherwise render it unsuitable for effective light propagation. The starting member may also be formed of graphite or the like.

In the manufacture of optical waveguides, the materials of the core and cladding of the waveguide should be produced from a glass having minimum light absorption characteristics, and although any optical quality glass may be used, a particularly suitable glass from which to make an optical waveguide is fused silica. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the index of refraction thereof. Therefore, if pure fused silica is used as the cladding glass, fused silica doped with the material to increase the index of refraction can be used as a core glass.

There are many suitable materials that can satisfactorily be used as a dopant alone or in combination with each other. These include, but are not limited to, titanium oxide, tantalum oxide, tin oxide, niobiuim oxide, zirconium oxide, aluminum oxide, lanthanum oxide, and germanium oxide. The amount of dopant used should be kept to a minimum for various reasons. First, since additional doping material would cause the index of refraction to increase, the difference between the index of refraction of the cladding glass and the core glass will also increase requiring a decrease in the allowable core diameter of the waveguide to obtain a waveguide having the same operating characteristics. Second, if an excessive amount of doping material is added to the base material, a loss of light transmission will result. Desirably, as small yet precise amount of dopant should be added to the base material for the primary purpose of changing the index of refraction. For the purposes of forming a waveguide in accordance with the present invention, the amount of dopant is preferably maintained below about 15 percent by weight of the total composition.

A particularly effective method of forming or applying a layer or coating is accomplished by a flame hydrolysis process similar to that described in U.S. Pat. No. 2,272,342 issued to J. F. Hyde or U.S. Pat. No. 2,326,059 issued to M. E. Nordberg. A modification of the Nordberg process that will provide titanium doped fused silca layer is as follows. Dry oxygen is bubbled through a tank containing a liquid mixture of approximately 53 percent by weight silicon-tetrachloride, $SiCl_4$, and 47 percent by weight titanium-tetrachloride, $TiCl_4$, which mixture is at a temperature of approximately 35°C. $SiCl_4$ and $TiCl_4$ vapors picked up by the oxygen are then passed through a gas-oxygen flame where they are hydrolyzed to form a soot, that is, minute glass particles, with a composition of approximately 95 percent by weight $SiO_2$ and 5 percent by weight $TiO_2$. The glass soot leaves the flame in a steady stream, and is deposited on a rotating starting member. The thickness of the resulting coating or layer is determined by the amount of soot deposited which is primarily controlled by the flow rates and the time allowed for deposition.

In the formation of $TiO_2$ containing $SiO_2$ by flame hydrolysis as heretofore described, it has been found that residual water, that is OH, $H_2$, and $H_2O$ in the glass contribute primarily to the amount of $Ti^{+3}$ or reduced $TiO_2$ present. Three $TiO_2$ reduction reactions occur that are of particular interest. These $TiO_2$ reduction reactions are illustrated as follows:

$$2TiO_2 \rightarrow Ti_2O_3 + \tfrac{1}{2} O_2 \quad (1)$$

$$2TiO_2 + \tfrac{1}{2} H_2 \rightarrow Ti_2O_3 + OH \quad (2)$$

$$2TiO_2 + H_2 \rightarrow Ti_2O_3 + H_2O \quad (3)$$

Reaction (1) is a thermal reduction of $TiO_2$ to $Ti_2O_3$. The equilibrium constant $K_1$ for reaction (1) is given by the equation $$K_1 = [O_2][Ti_2O_3]/[TiO_2]^2, \quad (4)$$

where the [ ] symbol indicates concentration.

Reaction (2) is the reduction of $TiO_2$ by hydrogen to form OH. The equilibrium constant $K_2$ for reaction (2) is given by the equation

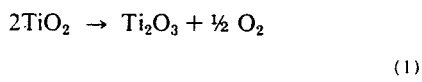

Hydrogen could also react with $TiO_2$ to form water and $Ti_2O_3$ in the glass by reaction (3). The equilibrium constant $K_3$ for reaction (3) is given by $$K_3 = [Ti_2O_3][H_2O]/[TiO_2]^2[H_2]. \quad (6)$$

Figure 2:
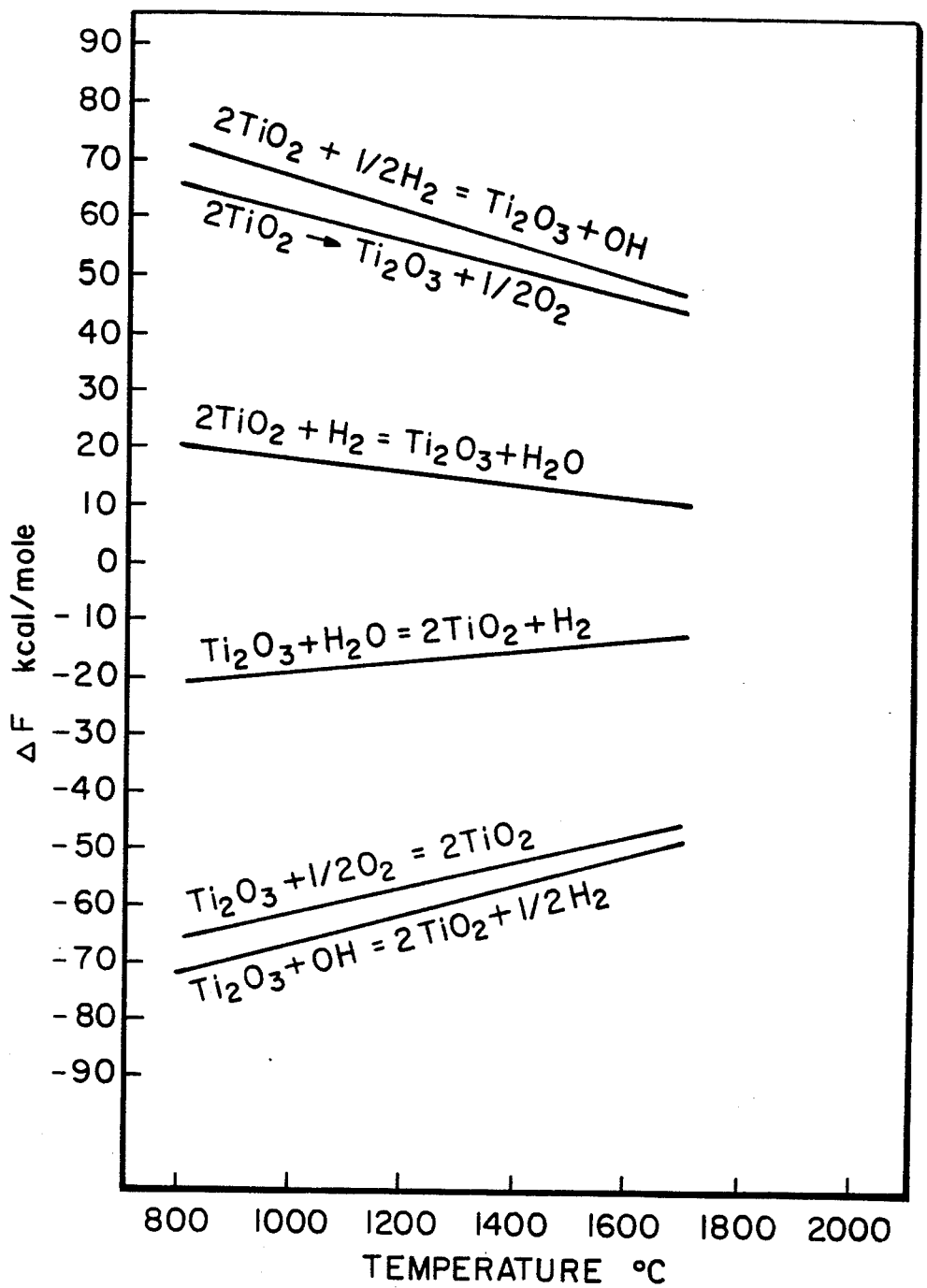
FIG. 2 is a graph illustrating free energy changes for $TiO_2$ oxidation-reduction reactions.

The value of the equilibrium constant for any reaction is related to the free energy change of the reaction by the equation $$\log_{10} K = -\Delta F_T/4.575\ T \quad (7)$$

where $\Delta F_t$ is the free energy change of the reaction at temperature T in degrees Kelvin. The free energy changes for reactions (1), (2), and 3) have been determined and the resulting free energy versus temperature data are plotted in FIG. 2.

From equation 4, the amount of $Ti_2O_3$ in equilibrium with $TiO_2$ is given by $$[Ti_2O_3] = K_1[TiO_2]^2/[O_2]. \quad (8)$$

Figure 3:
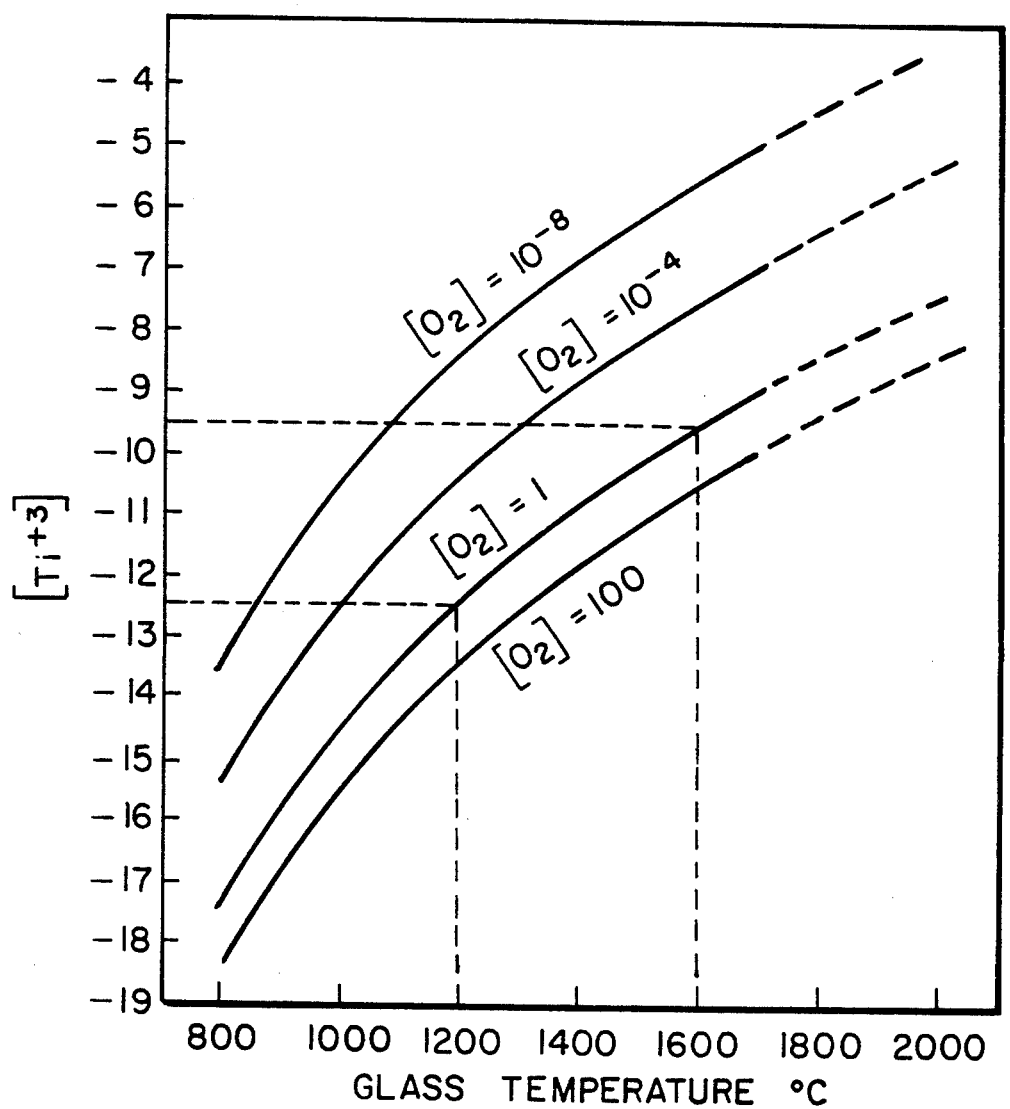
FIG. 3 is a graph illustrating the effect of temperature and oxygen concentration on reduction of $TiO_2$ to form $Ti^{+3}$ in a 2.5 percent by weight $TiO_2$ and 97.5 percent by weight $SiO_2$ glass.

In FIG. 3, the concentration of $Ti^{+3}$ in glass is plotted versus glass temperature for various oxygen concentrations. The effect of reducing the oxygen concentration is to increase the amount of reduced titania at any temperature, while increasing the temperature also increases the amount of titania reduction.

Figure 4:
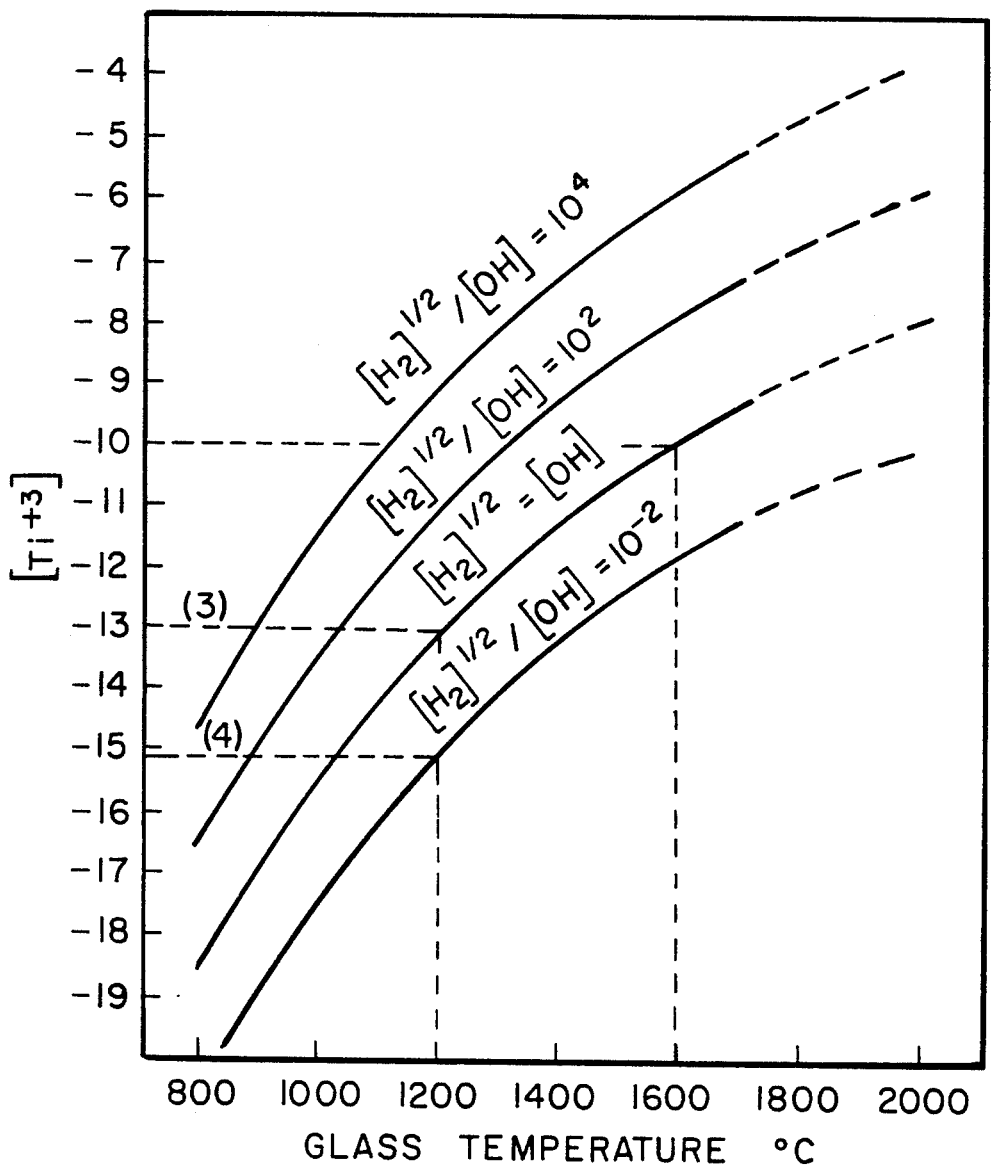
FIG. 4 is a graph illustrating the effect of $H_2$, OH on $Ti^{+3}$ in a 2.5 percent by weight $TiO_2$ and 97.5 percent by weight $SiO_2$ glass.
Figure 5:
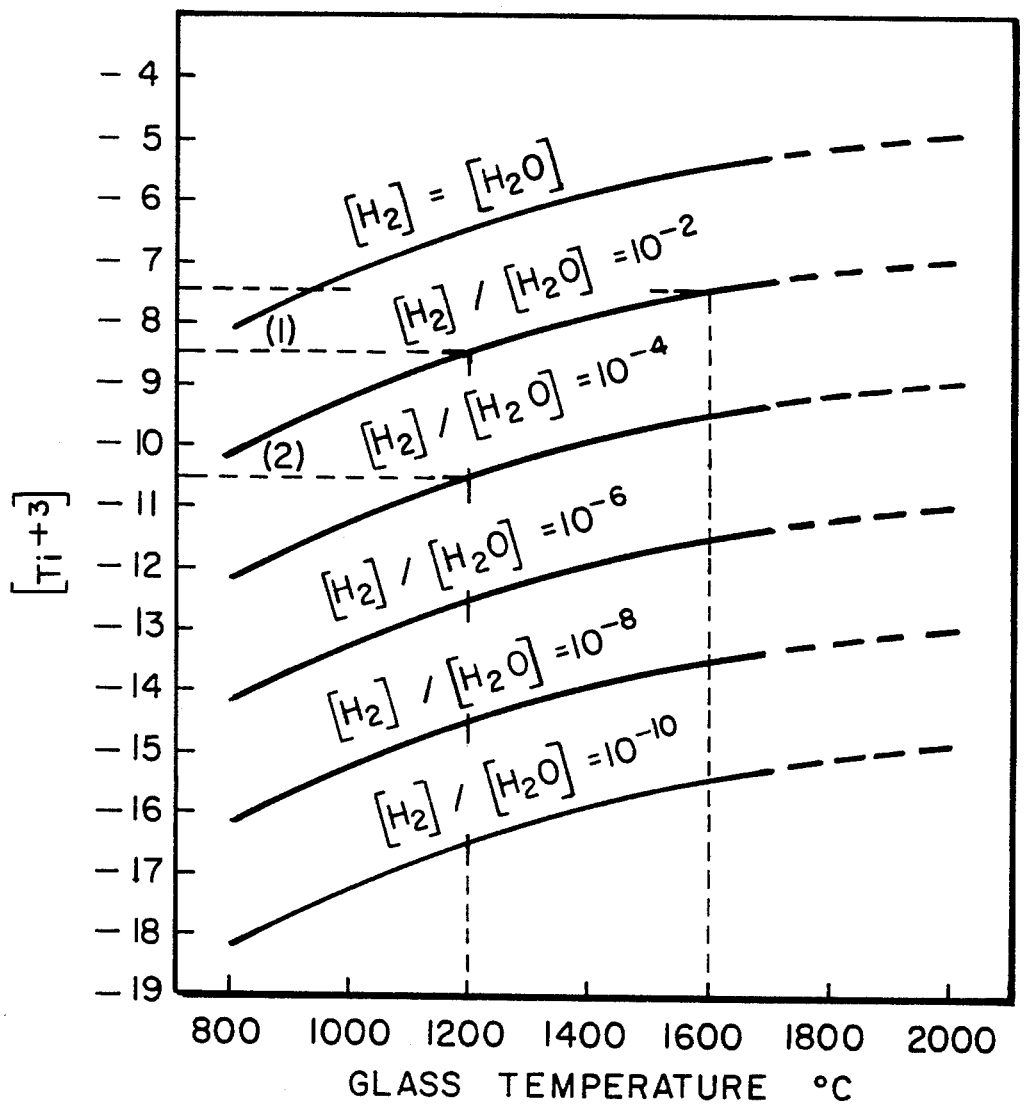
FIG. 5 is a graph illustrating the effect of $H_2$, $H_2O$ on $Ti^{+3}$ in a 2.5 percent by weight $TiO_2$ and 97.5 percent by weight $SiO_2$ glass.

To obtain the concentration of $Ti^{+3}$ in glass has has been plotted in FIGS. 3, 4, and 5, the following conversion must be made.

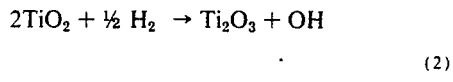

The amount of reduced titania produced by the reaction (2) is given by 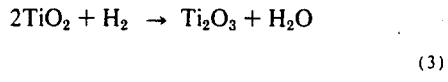

Since the amount of $Ti_2O_3$ is dependent on the ratio $[H_2]/[OH]$, the amount of reduced $TiO_2$ for various values of $[H_2]/[OH]$ has been determined and these data have been converted to concentration of $Ti^{+3}$ by equation (9) and have been plotted in FIG. 4.

The amount of reduced titania produced by reaction (3) is given by $$[Ti_2O_3] = K_3[TiO_2]^2[H_2]/[H_2O] \quad (11)$$

In this case, the amount of $Ti_2O_3$ is dependent on the ratio $[H^2]/[H_2O]$. These data have also been converted to concentrations of $Ti^{+3}$ as above explained and have been plotted for different values of $[H_2]/[H_2O]$ in FIG. 5.

The presence of $Ti^{+3}$ atoms in $TiO_2$ containing $SiO_2$ contributes greatly to light attenuation in the glass. It has been determined that 20 db/km attenuation can only be achieved if the $Ti^{+3}$ level in the glass is reduced to 0.1 ppb. FIGS. 3, 4, and 5 indicate that in the production of $TiO_2$ containing $SiO_2$ glass by flame hydrolysis, an appreciable concentration of $Ti^{+3}$ results from reactions (1), (2), and (3). To illustrate this result by a specific example, it is assumed that the temperature of the glass soot particles emitted from the flame hydrolysis burner is 1,600°C. and that incomplete combustion of gases in the burner gives values of $[O_2] = 1$, $[H_2]/[OH] = 1$ and $[H_2]/[H_2O] = 10^{-2}$, which values are typical for gas-oxygen flames. The amounts of $Ti^{+3}$ in the soot glass resulting from reactions (1), (2), and (3) are determined from FIGS. 3, 4, and 5 to be about $10^{-9.5}$, $10^{-10}$ and $10^{-7.5}$, respectively, at 1,600°C. The total $Ti^{+3}$ level in the glass is therefore seen to be greater than the 0.1 ppb level which must be reached to result in no more than about 20 db/km attenuation.

If the temperature of the glass is decreased and the glass is stabilized at such temperature within an oxygen environment, a decrease in the amount of $Ti^{+3}$ in the glass can be achieved by the reverse of reaction (b 1). Similarly, if the temperature of the glass is decreased and the glass is stabilized at such temperature within an environment, the water and hydrogen gas content of which is in equilibrium with that of the glass, a decrease in the amount of $Ti^{+3}$ in the glass can be achieved. These results are illustrated by FIGS. 3, 4, and 5 where, if the glass temperature is decreased and stabilized at 1,200°C. under the above conditions, the amount of $Ti^{+3}$ in the glass decreases to about $10^{-12.5}$, $10^{-13}$, and $10^{-8.5}$, respectively. From the preceding it is seen that reaction (3) involving water is the major cause for obtaining a high level of $Ti^{+3}$ in the glass. It has been found that by decreasing the total water and hydrogen gas content in the environment within which the glass is maintained, a release of residual water and hydrogen gas from the glass is obtained thereby decreasing the $Ti^{+3}$ content in the glass by the reverse of reactions (2) and (3). This is illustrated in FIG. 5 by dotted lines (1) and (2) which show that by changing the $[H_2]/[H_2O]$ ratio from $10^{-2}$ to $10^{-4}$ at 1,200°C., the $Ti^{+3}$ content in the glass decreases from about $10^{-8.5}$ to about $10^{-10.5}$ when equilibrium between the partial pressure of residual water and hydrogen gas in the glass and the environment is reached. Similarly, in FIG. 4 it is illustrated by dotted lines (3) and (4) that in changing the $[H_2]/[OH]$ ratio from 1 to $10^{-2}$ at 1,200°C., the $Ti^{+3}$ content in the glass decreases from about $10^{-13}$ to about $10^{-15}$ when equilibrium between the partial pressure of hydrogen in the glass and the environment is reached. Of course, further removal of residual water and hydrogen gas from the environment will further tend to decrease the $Ti^{+3}$ content in the glass when equilibrium is reached.

Although the above has been described in connection with $TiO_2$ containing $SiO_2$ glass, the same applies to other types of glasses which contain compounds of Sb, Sn, U, V, Nb, Mo, Th, Ti, and the like that can exist is a reduced state as a result of the same or similar reduction reactions.

Figure 6:
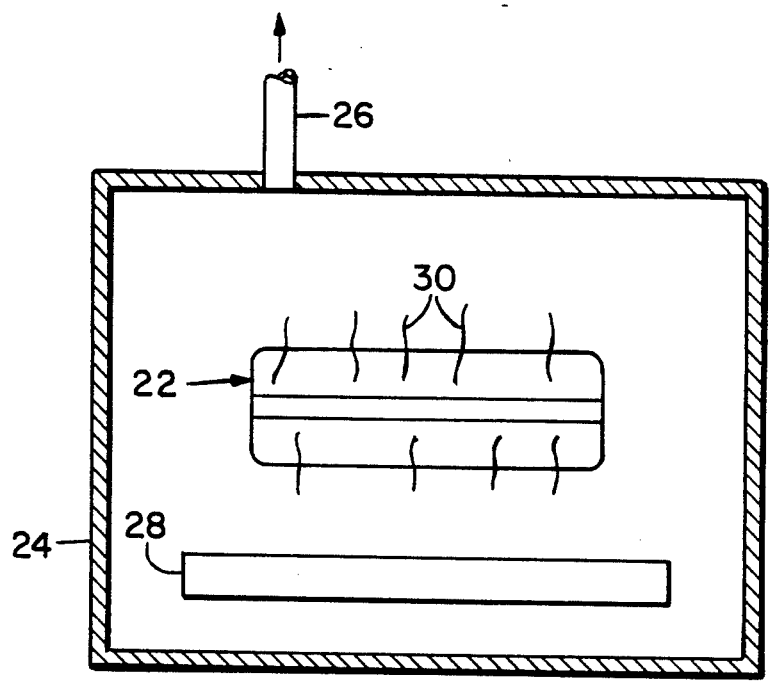
FIG. 6 is an illustration of a means of removing entrapped gas from a porous body.

Referring now to FIG. 6, there is shown an enclosed chamber 24 within which porous member 22 is disposed. The environment in chamber 24 is maintained at a degree of dryness corresponding to 20 pp.m or less of water vapor. This environment may be obtained by connecting pipe 26 to a suitable means for decreasing pressure such as a vacuum means, not shown. The temperature within chamber 24 is maintained at a desired level by heating means or heater 28.

By subjecting porous member 22 to such a controlled environment the residual water in the glass is removed. In the heretofore described example, when residual water is removed from a $TiO_2$ containing $SiO_2$ glass, reactions (2) and (3) take place in reverse. That is, in the reverse of reaction (2), the oxygen from the residual OH combines with the $Ti_2O_3$ in the glass forming $TiO_2$ and liberating hydrogen which escapes from the porous member into the chamber and subsequently from the chamber through pipe 26. The reverse of reaction (3) also takes place wherein the oxygen from the residual $H_2O$ molecules oxidizes the $Ti_2O_3$ that is present forming $TiO_2$ and again liberating hydrogen which escapes from porous member 22 as heretofore described. In both of these oxidizing reactions, the reduced titanium having a valence of +3 is converted to +4 titanium thereby reducing the amount of $ti^{+3}$ present in the member.

Porous member 22 is maintained within the controlled environment for that period of time which is required for an equilibrium to be reached between the partial pressure of the entrapped gas from the porous member and the partial pressure of the same gas in the chamber environment. As will be hereinafter described in detail, by properly selecting the controlled environment within chamber 24, the level of residual water which remains within the member can be reduced to a point wherein its presence does not significantly effect the utility of the ultimate article. The entrapped gas which escapes from porous member 22 is indicated by streams 30 in FIG. 6.

Figure 7:
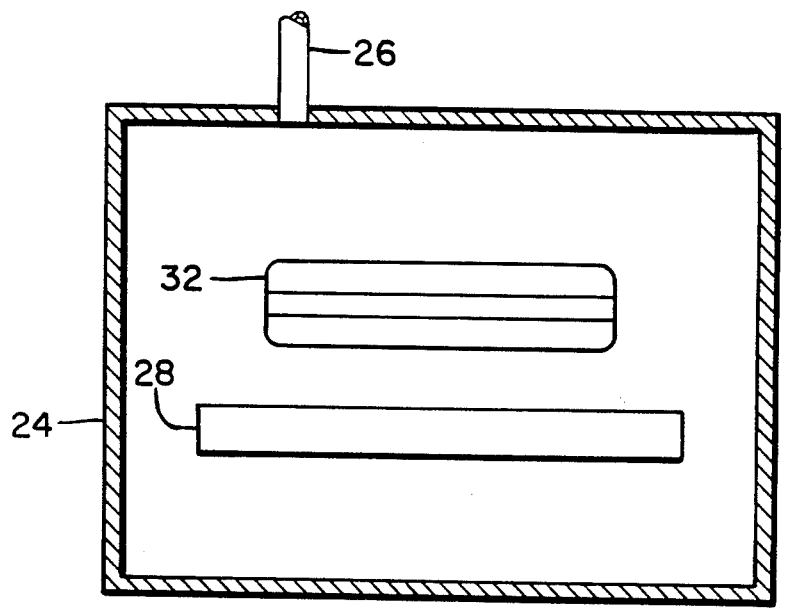
FIG. 7 is an illustration of a means of sintering a porous body to form a dense member.

After the residual water is reduced to the desired level, porous member 22 is maintained within the controlled environment and heated to at least the sintering temperature of the glass thereof by means of heater 28 to sinter the soot particles that form a consolidated dense member 32 as illustrated in FIG. 7. By sintering glass soot particles formed by flame hydrolysis, the resulting consolidated dense member 32 has a size approximately one-half of the size of porous member 22 from which it was formed.

Figure 8:
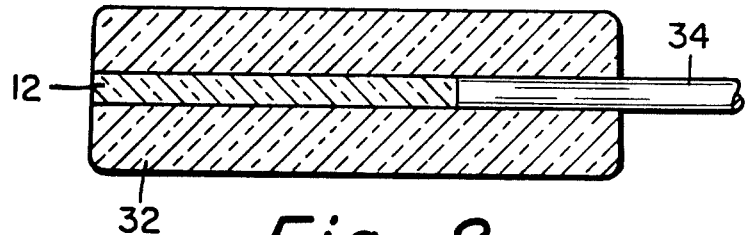
FIG. 8 is a fragmentary cross sectional elevation illustrating a means of removing the starting member.

After consolidated dense member 32 is formed, it may be removed from the controlled environment, if desired, for subsequent treatment, such for example as for removing starting member 12. This is illustrated in FIG. 8 wherein starting member 12 is shown being ground out by means of a diamond reamer 34, however, any other means for accomplishing this result such, for example, as hydrofluoric acid etching or core drilling are also suitable.

Figure 9:
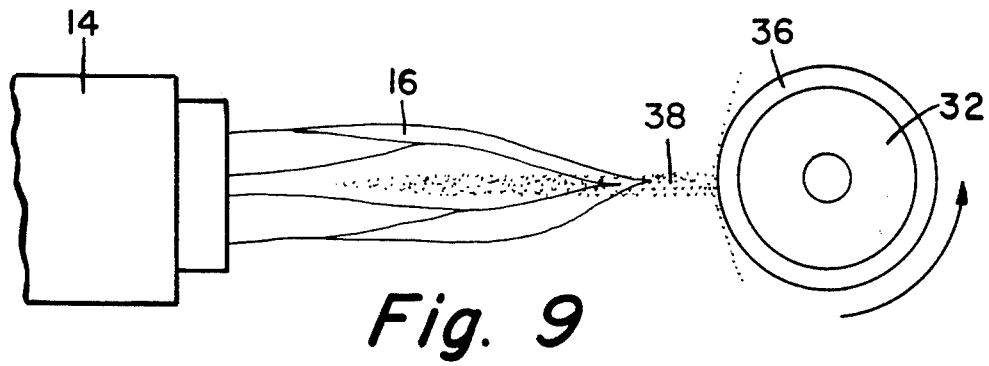
FIG. 9 is an illustration of a means of applying a coating to the outside surface of the consolidated dense member of the present invention.

If the consolidated member 32 must be transformed into a different shape through any of various glass forming operations, it may be returned to the predetermined controlled environment for such purposes. If, for example, an optical waveguide is desired, a cladding over the consolidated dense member must be formed. The formation of such a cladding is illustrated in FIG. 9 wherein a coating 36 of glass having an index of refraction less than that of the core is applied. If, for example, the core is formed of $TiO_2$ containing $SiO_2$ wherein the $TiO_2$ acts as a dopant to increase the index of refraction of the composition, the cladding may be formed of pure $SiO_2$ or $SiO_2$ doped to a lesser degree than that of the core. The application of coating 36 may be accomplished by the flame hydrolysis method heretofore described wherein a flame 16 is emitted from burner 14 and within which flame a gas-vapor mixture is hydrolyzed to form a glass soot as heretofore described. The soot leaves flame 16 in a stream 38 and is directed toward consolidated member 32 as illustrated in FIG. 9. In such an embodiment, it may be desired to also remove the residual water from the waveguide cladding, in which case the heretofore described procedure for removing such water is repeated. On the other hand, when an optical waveguide is ultimately desired, the core may be formed as heretofore described and thereafter a coating 36 applied thereover before the water is removed and the glass soot is sintered. In such a case, the gas-vapor mixture provided to the flame hydrolysis burner is changed to obtain the desired composition of the cladding material after the core is formed. The residual water removal and sintering would not be altered by having two different compositions comprising the porous member.

Figure 10:
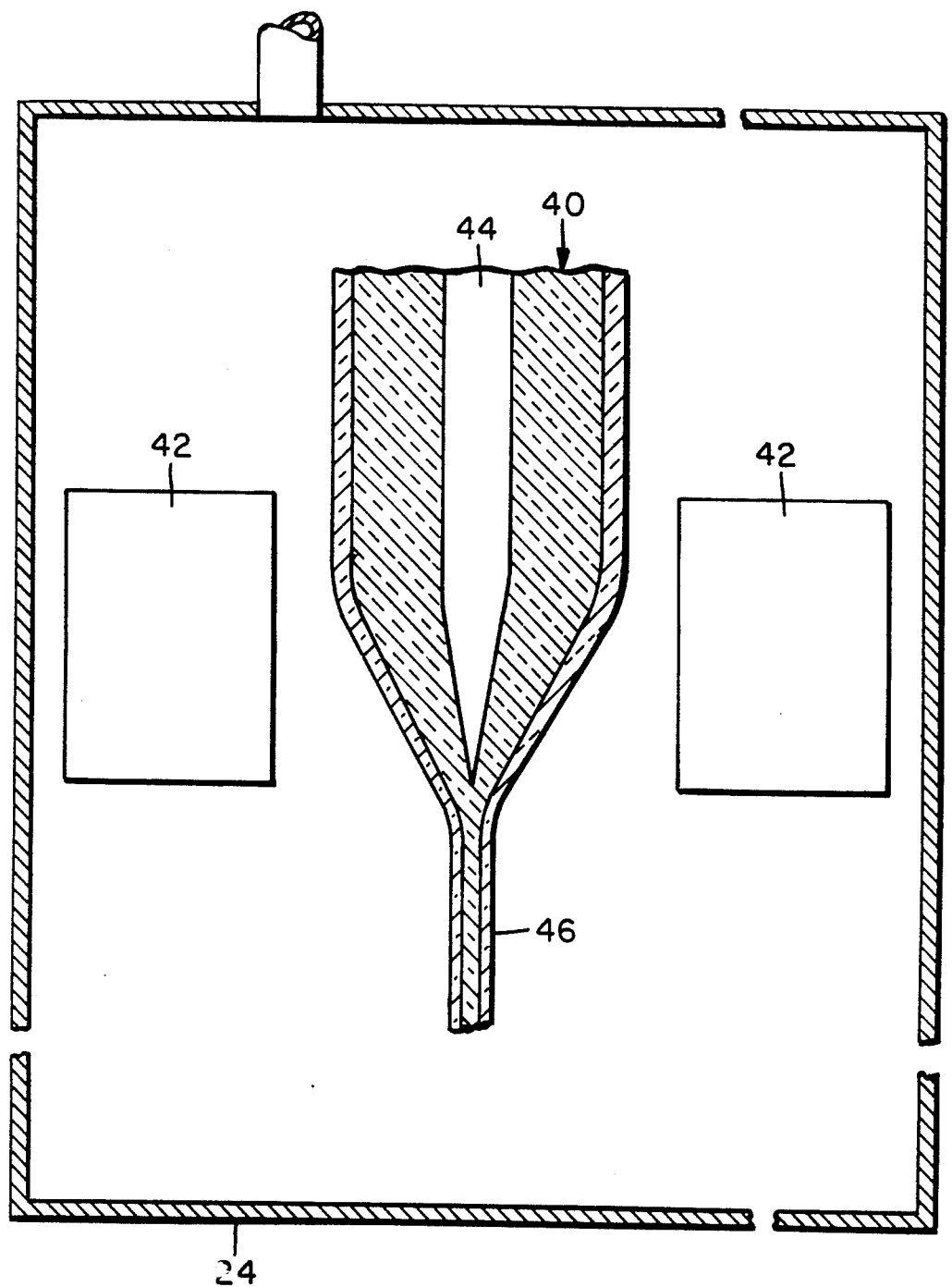
FIG. 10 is a fragmentary elevation partly in cross section of an optical fiber being formed.

In the optical waveguide embodiment, after both the core and cladding are consolidated as hereinabove described, the resulting structure 40 is either maintained at temperature or heated by furnace 42 and may be maintained within the controlled environment as illustrated in FIG. 10, if desired. It may, however, be heated in air at this point of the process. After the structure reaches a temperature at which the materials have a low enough viscosity for drawing, it is drawn until longitudinal hole 44 collapses, that is the core glass fills hole 44 to form a solid core. The structure is than further drawn until the cross sectional size thereof is reduced sufficiently to produce fiber 46. Such a clad fiber thereafter forms the optical waveguide.

A typical example of one embodiment of the present invention is as follows. A starting member of fused quartz, approximately ⅛ inches in diameter and about 10 inches long is sealed to a suitable handle. A liquid mixture containing 30.4 percent by weight $TiCl_4$ and 69.6 percent by weight $SiCl_4$ is heated to 35°C. Dry oxygen is bubbled through the liquid mixture and $SiCl_4$ and $TiCl_4$ vapors are picked up by the oxygen. This vapor containing oxygen is then passed through a gas-oxygen flame where the vapors hydrolyze to form a steady stream of approximately 0.1 $\mu$ spherelike particles having a composition of 2.5 percent by weight $TiO_2$ and 97.5 percent by weight $SiO_2$. The stream is directed to the starting member and a soot layer of these particles is applied up to about 1.5 inches in diameter. A second coating of 100 percent $SiO_2$ would than be applied over the first soot layer by the same flame hydrolysis method described above except that the liquid mixture does not contain $TiCl_4$. The $SiO_2$ soot would be applied until an outside diameter of approximately 2.5 inches is obtained. This structure is then placed in an enclosed chamber which is connected to a suitable vacuum producing means. The chamber is evacuated and maintained at less than $10^{-5}$ Torr and is heated incremently in steps of about 100°C. As the structure increases in temperature, the residual water is removed by permitting the entrapped gases to escape therefrom. As the gases escape from the porous member, the predetermined pressure within the chamber is continually maintained at the same level by the vacuum means. The structure is heated until an equilibrium is reached between the partial pressure of the entrapped gas within the structure and the partial pressure of the same gas within the chamber. That is, the structure is heated until the pressure within the chamber no longer increases or tends to increase with an incremental increase in temperature. This equilibrium point is reached for the structure of the present example in about 24 hours at a temperature of about 1,200°C. at which time there is less than 20 ppm of water present in the soot.

Thereafter, while maintaining the controlled environment within the chamber, the porous body is heated to at least a temperature of 1,400°C., which is the sintering temperature of the glass, to sinter the soot particles and form a consolidated dense member. After the particles have sintered and a transparent, consolidated, dense glass member is obtained, it is removed from the chamber. The fused quartz starting member is then ground out by means of a diamond reamer. The tubular member so formed is rinsed in about a 50 percent hydrofluoric acid solution, flame polished, and washed again in said acid solution to provide a clean tubular member. The tubular member is then heated to a temperature of about 2,000°C., at which it is drawn. As the structure is drawn, it decreases in diameter and a central hole collapses. Drawing is continued until the final desired optical waveguide dimensions are obtained. The optical waveguide produced in accordance with the above example contains less than 20 ppm of water and has a signal light attenuation of less than 20 db/km.

A specific example of another embodiment of the present invention is as follows. All the steps of the above example are the same except that the controlled environment within which the porous member was heated was an atmospheric pressure environment having a dew point lower than 130°F. This environment was achieved by using a liquid gas source and a pressure tight system. The system is flushed out with the gas from said source until the system contains only such gas. The dew point of such gas would correspond to the boiling point of the liquid gas. For example, liquid oxygen has a boiling point of −297.4°F at one atmosphere pressure. After an equilibrium is reached between the partial pressure of the entrapped gas in the structure and the partial pressure of the same gas in the said environment, the porous member is heated to at least the sintering temperature of the glass soot and the soot particles are sintered to form a consolidated dense member within such environment having a dew point of less than 130°F. A waveguide produced by the method of this embodiment would also result in one having less than 20 ppm of water and a light signal attenuation of less than 20 db/km.

Although the present invention has been described with respect to specific details of certain embodiments thereof, it is not intended that such details be limitations upon the scope of the invention except insofar as set forth in the following claims.

I claim:

1. The method of forming an article comprising the steps of providing a suitable starting member, forming glass soot by flame hydrolysis, depositing a quantity of said glass soot on said starting member to form a porous body thereof, disposing said porous body in a controlled environment, maintaining a predetermined desired concentration of gases in said environment, heating said porous body to a temperature below the sintering temperature of said glass to permit entrapped gas to escape therefrom, maintaining said temperature until an equilibrium is reached between the partial pressure of the entrapped gas in said body and the partial pressure of the same gas in said environment, thereafter heating said porous body to at least the sintering temperature of said glass to sinter said soot particles and form a consolidated dense member, forming said member to a desired shape, and removing the article so formed from said environment.

2. The method of claim 1 further comprising the step of removing said starting member before the step of forming said member to a desired shape.

3. The method of claim 1 wherein said controlled environment contains less than about 20 parts per million of water vapor.

4. The method of claim 1 wherein said glass soot is fused silica doped with at least one material selected from the group consisting of titanium oxide, tantalum oxide, tin oxide, niobium oxide, zirconium oxide, aluminum oxide, lanthanum oxide, and germanium oxide.

5. The method of claim 4 wherein said soot is fused silica doped with not more than 15 percent by weight titanium oxide.

6. The method of claim 5 wherein said article so formed contains less than 20 parts per million of residual water.

7. The method of claim 5 wherein said porous body is heated to a temperature of about 1,200°C.

8. The method of claim 7 wherein said temperature is maintained for a period of at least 24 hours.

9. The method of claim 1 further comprising the steps of applying a coating of glass soot having an index of refraction less than that of the glass of said porous body over the outside peripheral surface of said porous body before it is disposed within said controlled environment.

10. The method of claim 9 wherein said controlled environment contains less than about 20 parts per million of water vapor.

11. The method of claim 9 wherein said coating of glass soot is applied by flame hydrolysis.

12. The method of claim 11 wherein said porous body is formed of doped fused silica and said coating is formed of fused silica doped to a lesser degree than that of said porous body.

13. The method of claim 12 wherein said porous body is fused silica doped with at least one material selected from the group consisting of titanium oxide, tantalum oxide, tin oxide, niobium oxide, zirconium oxide, aluminum oxide, lanthanum oxide, and germanium oxide.

14. The method of claim 13 wherein said porous body is formed of fused silica doped with not more than 15 percent by weight of titanium oxide.

15. The method of claim 14 wherein said porous body and said coating are sintered simultaneously.

16. The method of claim 15 wherein said article so formed contains less than 20 parts per million of residual water.

17. The method of claim 1 further comprising the step of applying a coating a glass soot over the consolidated dense member.

18. The method of claim 17 further comprising the steps of disposing the structure so formed in a controlled environment, maintaining a predetermined desired concentration of gases in said environment, heating said structure to a temperature below the sintering temperature of the glass thereof to permit entrapped gas to escape from said porous coating, maintaing said temperature until an equilibrium is reached between the partial pressure of the entrapped gas within said porous coating and the partial pressure of the same gas in said environment, and heating said structure to at least the sintering temperature of the glass of said soot to sinter said soot particles and form a consolidated dense coating over said consolidated member.

19. The method of claim 18 wherein said controlled environment contains less than about 20 parts per million of water vapor.

20. The method of claim 18 further comprising the step of removing said starting member.

21. The method of claim 20 wherein said forming said member comprises the steps of heating the structure so formed to the drawing temperature of the materials thereof, and drawing the heated structure to reduce the cross sectional area thereof and to collapse the hole resulting from removing said starting member and to form a clad fiber having a solid cross-section, the collapsed consolidated dense member forming the core of said fiber and said coating forming the fiber cladding.

22. The method of claim 21 wherein said drawing is performed within said environment.

23. The method of claim 22 wherein said article so formed contains less than 20 parts per million of residual water.

24. An article formed by the method of claim 1.